United States Patent
Lootens et al.

(10) Patent No.: US 12,234,366 B2
(45) Date of Patent: Feb. 25, 2025

(54) METHOD FOR THE 3D PRINTING OF TWO-COMPONENT POLYURETHANE COMPOSITIONS

(71) Applicant: SIKA TECHNOLOGY AG, Baar (CH)

(72) Inventors: Didier Lootens, Küsnacht (CH); Maxime Liard, Zürich (CH); Nicolas Bernardini, Eaubonne (FR); Fleur Chaignon-Lesetre, Serifontaine (FR); Antonio Corsaro, Regensdorf (CH)

(73) Assignee: SIKA TECHNOLOGY AG, Baar (CH)

( * ) Notice: Subject to any disclaimer, the term of this patent is extended or adjusted under 35 U.S.C. 154(b) by 742 days.

(21) Appl. No.: 17/291,174

(22) PCT Filed: Dec. 18, 2019

(86) PCT No.: PCT/EP2019/085951
§ 371 (c)(1),
(2) Date: May 4, 2021

(87) PCT Pub. No.: WO2020/127484
PCT Pub. Date: Jun. 25, 2020

(65) Prior Publication Data
US 2021/0363366 A1  Nov. 25, 2021

(30) Foreign Application Priority Data
Dec. 21, 2018  (EP) ..................... 18215746

(51) Int. Cl.
| | | |
|---|---|---|
| B29C 64/106 | (2017.01) | |
| B33Y 70/00 | (2020.01) | |
| C08G 18/22 | (2006.01) | |
| C08G 18/32 | (2006.01) | |
| C08G 18/38 | (2006.01) | |
| C08G 18/48 | (2006.01) | |
| C08G 18/66 | (2006.01) | |
| C08G 18/76 | (2006.01) | |
| C09D 11/102 | (2014.01) | |
| B29K 75/00 | (2006.01) | |
| B33Y 10/00 | (2015.01) | |

(52) U.S. Cl.
CPC ............ *C09D 11/102* (2013.01); *B33Y 70/00* (2014.12); *C08G 18/227* (2013.01); *C08G 18/3206* (2013.01); *C08G 18/3876* (2013.01); *C08G 18/4829* (2013.01); *C08G 18/6674* (2013.01); *C08G 18/7671* (2013.01); *B29C 64/106* (2017.08); *B29K 2075/00* (2013.01); *B33Y 10/00* (2014.12)

(58) Field of Classification Search
CPC .... B33Y 10/00; B29C 64/106; B29K 2075/00
USPC ........................................... 264/308
See application file for complete search history.

(56) References Cited

U.S. PATENT DOCUMENTS

| | | | |
|---|---|---|---|
| 5,587,448 A | * | 12/1996 | Engen .................. C08G 18/089 528/48 |
| 9,453,142 B2 | | 9/2016 | Rolland et al. |

FOREIGN PATENT DOCUMENTS

| | | |
|---|---|---|
| CN | 104479343 A | 4/2015 |
| CN | 106142564 A | 11/2016 |
| DE | 37 09 631 A1 | 10/1987 |
| DE | 199 37 770 A1 | 2/2001 |
| EP | 0 800 544 B1 | 9/1998 |
| WO | 2017/130685 A1 | 8/2017 |
| WO | 2019/002538 A1 | 1/2019 |

OTHER PUBLICATIONS

Apr. 8, 2020 Search Report issued in International Patent Application No. PCT/EP2019/085951.

* cited by examiner

*Primary Examiner* — Jeffrey M Wollschlager
*Assistant Examiner* — Xue H Liu
(74) *Attorney, Agent, or Firm* — Oliff PLC

(57) ABSTRACT

A method applying a two-component polyurethane composition by means of 3D printing, including steps providing pumpable first component A including at least one polyol having OH functionality in range from 1.5-4 and average molecular weight Mn in range from 250 to 15 000 g/mol, and at least one diol having two hydroxyl groups joined via a C2-C9 carbon chain, and at least one compound T having at least one thiol group; feeding pumpable second component B into continuous mixer's mixing region, where second component B includes at least one polyisocyanate; wherein one of components A and B additionally includes at least one metal catalyst for reaction of hydroxyl groups and isocyanate groups that is able to form thio complexes, and molar ratio of all thiol groups in at least one compound T to all metal atoms in at least one metal catalyst K is between 1:1 and 250:1.

16 Claims, No Drawings

METHOD FOR THE 3D PRINTING OF TWO-COMPONENT POLYURETHANE COMPOSITIONS

TECHNICAL FIELD

The invention relates to a method for the 3D printing of two-component polyurethane compositions and to shaped bodies produced thereby.

STATE OF THE ART 3D printing is a method that has recently found increasing use for production of three-dimensional objects. It is used particularly in the commercial sector, for instance for prototypes or design studies, as a rapid and flexible alternative to injection molding, and permits virtually unlimited shaping in the production of relatively small objects. The 3D printing method is also referred to as freeform construction or additive manufacturing (AM). Typical print materials for 3D printing are thermoplastics such as polylactic acid (polylactides, PLA) or acrylonitrile-butadiene-styrene (ABS), which are heated and applied pointwise or layerwise in the plastic state, and then rapidly solidify and become solid. The material is usually applied by means of a moving printhead that is controlled by a computer. The polymers gain sufficient strength through cooling to maintain their given shape. Because the materials are thermoplastic and must have a sufficiently low melting range for practical application, however, the shaped bodies produced from such materials are chemically and physically limited, especially with regard to chemical stability, thermal stability, weathering stability and mechanical properties such as elasticity and toughness. In addition, the 3D printing method is limited in that the necessary heating of the materials necessitates heatable 3D printing elements, and the method is relatively slow since the cooling process with the solidification of the printed materials limits the printing speed.

There have already been attempts, rather than the standard thermoplastic print materials, to use those that rapidly cure chemically during or after printing and form a thermoset or elastomeric material. The chemical basis for such print materials is, for instance, RTV-2 silicones, two-component epoxy materials or two-component polyurethanes. Two-component materials are advantageous, if not essential, in such methods in that the highly reactive constituents such as curing agents and binders are present separately at first and only begin to cure on or after mixing of the two components. It is important here that the curing reaction firstly proceeds rapidly for the 3D printing method to be performable at practicable speed, but secondly can also cure homogeneously in deeper layers and is not dependent on external curing factors such as air humidity. However, this is not easy to accomplish. The two-component compositions must be reactive enough with one another for a rapid 3D printing method to be possible. However, such two-component compositions begin to react as soon as they are mixed, which results in a rapid rise in viscosity. This is a problem with 3D printing since a homogeneous mixture has to be achieved, and therefore a certain dwell time in a static or dynamic mixer is needed. If, however, the reactivity is too high, the viscosity will rise significantly as a result of progressive curing even in the mixer, and exact constant application time will be difficult, and at least the mixing and application time will be distinctly limited. This is also barely controllable by heating or in any other way, especially since heating also usually accelerates the chemical curing reaction even further. In the worst-case scenario, the application nozzle becomes blocked. This is of course undesirable.

Patent application CN 104479343 A describes, for example, two-component polyurethane compositions comprising a polyol, a polyisocyanate and a curing catalyst that are applied in a 3D printing method. However, these compositions must be matched specifically to the 3D printer in order to avoid the problems described above as far as possible. In general, however, it remains a challenge to adjust the composition such that it cures with sufficient speed to enable a practicable printing process, but nevertheless does not block the 3D printer because the curing proceeds too quickly. At the same time, high-performance pumping and mixing mechanisms are required for the mixture that thickens constantly as a result of the progressive curing.

A method that can be better controlled is taught in U.S. Pat. No. 9,453,142 B2, where a polyurethane composition comprising a blocked polyisocyanate and a light-activatable chemical curing mechanism is disclosed. This method does solve the problem of controlling curing, but is dependent on complex, costly raw materials and requires a suitable light source for curing.

Document CN 106142564 A also discloses a 3D printing method for polyurethane compositions, but comprising an additional thermal curing step after the printing method. This limits the possible geometry and size of the printed shaped bodies and limits the efficiency and speed of the method as a result of the additional need for heat treatment.

In general, polyurethanes would be very attractive for 3D printing since the materials obtainable, in the cured state, permit a wide range of mechanical properties and chemical and thermal stability, and the raw materials are inexpensive and readily available. It is also relatively simple to adjust the reactivity of two-component polyurethanes to a desired method, for instance through the choice of the polyisocyanates or of the curing catalyst. However, as mentioned above, a compromise always has to made. Either the pot life, i.e. the time after the mixing of the components during which application is still possible, is very short in the case of compositions that rapidly cure and build up strength, or else the curing and buildup of strength are slow when compositions having long pot life are processed, which greatly slows 3D printing, since it is necessary in the case of larger shaped articles to wait for the lower layers to cure sufficiently.

There is therefore an urgent desire for a method of 3D printing of two-component polyurethane compositions that build up barely any viscosity on and after mixing in the 3D printer and can be applied easily and without heating, but cure very rapidly after application, in order that a 3D printing method can be performed with rapid cycles. What would be particularly desirable would be such a method that enables thermoset or elastomeric shaped articles with largely freely adjustable mechanical properties, which consist of standard, inexpensively available raw materials. It would also be particularly desirable to be able to freely adjust the pot life of such compositions for the desired 3D printing application, in order that it can be implemented readily in various 3D printing systems.

SUMMARY OF THE INVENTION

It is therefore an object of the present invention to provide a 3D printing method for two-component polyurethane compositions that meets the abovementioned requirements. It is thus an object of the present invention to provide a method of 3D printing of two-component polyurethane compositions, wherein the two-component polyurethane compositions build up barely any viscosity after mixing in the 3D printer and can be applied easily and without heating, but cure very rapidly after application, in order that a 3D printing method can be performed with rapid cycles.

This object is surprisingly achieved by the method of the invention as claimed in claim 1. The polyurethane composition used in the method comprises a polyol, preferably a short-chain diol, and also a compound having at least one thiol group in the first component and a polyisocyanate in the second component. For curing the composition, the composition further contains a metal catalyst that is able to form thio complexes, with the ratio of thiol groups to metal atoms in the composition being fixed. The composition, in the cured state, has very substantially adjustable mechanical, chemical and thermal properties that go beyond those of the current standard thermoplastic print materials. The method of the invention enables thermoset or elastomeric shaped articles with largely freely adjustable mechanical properties, which consist of standard, inexpensively available raw materials. The method of the invention also permits free adjustment of the pot life of such compositions for the desired 3D printing application, in order that it can be implemented readily in various 3D printing systems.

The advantages of the method of the invention compared to conventional 3D printing methods with thermoplastic materials are manifold:

One advantage is that 3D-printed shaped bodies can be obtained with distinctly improved mechanical properties (for example elasticity, toughness, compressive and tensile strength). It is possible to produce true thermoset and elastomeric shaped articles that have distinctly improved temperature, weathering and load stability.

An additional advantage is the immense freedom of formulation in the polyurethane composition used in accordance with the invention. It is possible to use standard inexpensive raw materials, and the possible resulting range of properties of the cured material corresponds to that generally possible in modern polyurethanes.

A further advantage is simpler and faster application since there is no longer a need for heating and melting, and the low viscosity of components A and B and of the mixed composition achieves easier and faster conveyability. In addition, there is no need to wait for the material to solidify, and the 3D printing method can thus be performed much more quickly than with conventional thermoplastic materials. An additional advantage of the method of the invention is the virtually freely adjustable pot life of the polyurethane composition used in accordance with the invention that can be optimized for virtually any 3D printing system. This permits flexibility in application that has not been achieved to date.

A further advantage of the polyurethane composition used in accordance with the invention is that there is barely any rise in viscosity during the pot life, even in the mixed state, and hence very easy and exact application is possible. However, the material cures very rapidly after the pot life has elapsed. This makes it possible to perform a rapid and efficient printing method with rapid buildup of the layers.

Further aspects of the invention are the subject of further independent claims. Particularly preferred embodiments of the invention are the subject of the dependent claims.

Ways of Executing the Invention

The present invention relates to a method of applying a two-component polyurethane composition by means of 3D printing, comprising the steps of providing a pumpable first component A comprising at least one polyol A1 having an OH functionality in the range from 1.5 to 4 and an average molecular weight (number average) $M_n$ in the range from 250 to 15 000 g/mol, and preferably at least one diol A2 having two hydroxyl groups joined via a C2 to C9 carbon chain, and at least one compound T having at least one thiol group;

feeding the first component A, especially by means of a pump, to a continuous mixer comprising an inlet, a mixing region having at least one static or dynamic mixing element connected to the inlet, an outlet into which the mixing region opens, wherein the first component A is conveyed through the at least one inlet into the mixing region;

feeding a pumpable second component B into the mixing region of the continuous mixer, where the second component B comprises at least one polyisocyanate I;

mixing the first component A with the second component B in the mixing region of the continuous mixer to give a mixed curable polyurethane composition;

conveying the mixed curable polyurethane composition to the outlet; and applying the mixed curable polyurethane composition layer by layer, especially by means of a moving printhead;

wherein one of the two components A and B additionally includes at least one metal catalyst K for the reaction of hydroxyl groups and isocyanate groups that is able to form thio complexes, and the molar ratio of all the thiol groups in the at least one compound T to all metal atoms in the at least one metal catalyst K is between 1:1 and 250:1.

The prefix "poly" in substance names such as "polyol", "polyisocyanate", "polyether" or "polyamine" in the present document indicates that the respective substance formally contains more than one of the functional group that occurs in its name per molecule.

In the present document the term "polymer" firstly encompasses a collective of macromolecules that are chemically uniform but differ in the degree of polymerization, molar mass, and chain length, said group having been produced by a "poly" reaction (polymerization, polyaddition, polycondensation). The term secondly also encompasses derivatives of such a collective of macromolecules from "poly" reactions, i.e. compounds that have been obtained by reactions, for example additions or substitutions, of functional groups on defined macromolecules and that may be chemically uniform or chemically nonuniform. The term further encompasses so-called prepolymers too, i.e. reactive oligomeric initial adducts, the functional groups of which are involved in the formation of macromolecules.

The term "polyurethane polymer" encompasses all polymers produced according to the so-called diisocyanate polyaddition process. This also includes polymers that are virtually or completely free of urethane groups. Examples of polyurethane polymers are polyether polyurethanes, polyester polyurethanes, polyether polyureas, polyureas, polyester polyureas, polyisocyanurates, and polycarbodiimides.

In the present document, "molecular weight" is understood to mean the molar mass (in grams per mole) of a molecule or a molecule residue. "Average molecular weight" refers to the number average $M_n$ of a polydisperse mixture of oligomeric or polymeric molecules or molecule residues, which is typically determined by gel-permeation chromatography (GPC) against polystyrene as standard. In the present document, "room temperature" refers to a temperature of 23° C. Percent by weight values, abbreviated to % by weight, refer to the proportions by mass of a constituent in a composition based on the overall composition, unless otherwise stated. The terms "mass" and "weight" are used synonymously in the present document.

A "primary hydroxyl group" refers to an OH group attached to a carbon atom having two hydrogens.

In this document, the "pot life" refers to the time within which, after mixing the two components, the polyurethane composition can be processed before the viscosity resulting from the progression of the crosslinking reaction has become too high for further processing.

The term "strength" in the present document refers to the strength of the cured composition, with strength meaning in particular the tensile strength and modulus of elasticity, particularly within the 0.05% to 0.25% region of elongation.

The term "pumpable" means that the material in question is at least sufficiently free-flowing that it can be conveyed by pumping, or pressure in general, through a hose or a tube, for example. What is preferably meant by "pumpable" is that the material is pumpable at room temperature. However, it may be advantageous to slightly heat the material to increase pumpability, for example to from 30 to 60° C. In the present document, "room temperature" refers to a temperature of 23° C.

A substance or a composition is described as "storage-stable" or "storable" if it can be stored at room temperature in a suitable container over a prolonged period, typically for at least 3 months up to 6 months or more, without this storage resulting in any change in its application or use properties, particularly in the viscosity and crosslinking rate, to an extent relevant to the use thereof.

All industry standards and norms mentioned in this document relate to the versions valid at the date of first filing.

3D printing is a mold-free method of shaping. The material is applied layer by layer, and hence three-dimensional articles are produced. The layer-by-layer buildup is effected under computer control from one or more liquid or solid materials according to defined masses and shapes.

"3D printing", also referred to as "freeform construction", is understood in the present document to be a method of producing shaped bodies, in which a deformable material is applied in one or more layers or relatively small portions, and forms a solid shaped body after curing. The layers are not applied here by spraying.

In the present document, "dynamic mixing element" or "dynamic mixer" is understood to mean a component that comprises moving elements and is suitable for mixing solid and/or liquid constituents.

A "static mixer" is a device for mixing of fluids in which the mixing is brought about solely by the flowing motion and which does not have any moving elements. It especially consists of flow-influencing elements that are usually in the form of screws, lamellae or else grids, and which are disposed in a pipe or cavity through which the fluid to be mixed flows.

The first component A comprises firstly at least one polyol A1 having an OH functionality in the range from 1.5 to 4 and an average molecular weight in the range from 250 to 15 000 g/mol.

Suitable polyols A1 are in principle all polyols currently used in the production of polyurethane polymers. Particularly suitable are polyether polyols, polyester polyols, poly(meth)acrylate polyols, polybutadiene polyols, polycarbonate polyols, and also mixtures of these polyols.

Suitable polyether polyols, also known as polyoxyalkylene polyols or oligoetherols, are in particular those that are polymerization products of ethylene oxide, 1,2-propylene oxide, 1,2- or 2,3-butylene oxide, oxetane, tetrahydrofuran or mixtures thereof, optionally polymerized with the aid of a starter molecule having two or more active hydrogen atoms such as water, ammonia or compounds having a plurality of OH or NH groups, for example ethane-1,2-diol, propane-1,2-diol and -1,3-diol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, cyclohexane-1,3-dimethanol and -1,4-dimethanol, bisphenol A, hydrogenated bisphenol A, 1,1,1-trimethylolethane, 1,1,1-trimethylolpropane, glycerol, aniline, and also mixtures of the recited compounds. It is possible to use either polyoxyalkylene polyols having a low degree of unsaturation (measured in accordance with ASTM D-2849-69 and expressed in milliequivalents of unsaturation per gram of polyol (meq/g)), produced for example using so-called double metal cyanide complex catalysts (DMC catalysts), or polyoxyalkylene polyols having a relatively high degree of unsaturation, produced for example using anionic catalysts such as NaOH, KOH, CsOH or alkali metal alkoxides. Particularly suitable are polyoxyethylene polyols and polyoxypropylene polyols, in particular polyoxyethylene diols, polyoxypropylene diols, polyoxyethylene triols, and polyoxypropylene triols.

Especially suitable are polyoxyalkylene diols or polyoxyalkylene triols having a degree of unsaturation lower than 0.02 meq/g and having a molecular weight within a range from 1000 to 15 000 g/mol, as are polyoxyethylene diols, polyoxyethylene triols, polyoxypropylene diols, and polyoxypropylene triols having a molecular weight of 400 to 15 000 g/mol.

Likewise particularly suitable are so-called ethylene oxide-terminated ("EO-endcapped", ethylene oxide-end-capped) polyoxypropylene polyols. The latter are special polyoxypropylene polyoxyethylene polyols that are obtained for example when pure polyoxypropylene polyols, in particular polyoxypropylene diols and triols, are at the end of the polypropoxylation reaction further alkoxylated with ethylene oxide and thus have primary hydroxyl groups. Preference in this case is given to polyoxypropylene polyoxyethylene diols and polyoxypropylene polyoxyethylene triols.

Also suitable are hydroxyl-terminated polybutadiene polyols, for example those produced by polymerization of 1,3-butadiene and allyl alcohol or by oxidation of polybutadiene and also the hydrogenation products thereof.

Also suitable are styrene-acrylonitrile grafted polyether polyols such as those commercially available for example under the trade name Lupranol® from Elastogran GmbH, Germany.

Suitable polyester polyols include in particular polyesters that bear at least two hydroxyl groups and are produced by known processes, in particular polycondensation of hydroxycarboxylic acids or polycondensation of aliphatic and/or aromatic polycarboxylic acids with dihydric or polyhydric alcohols. Especially suitable are polyester polyols produced from dihydric to trihydric alcohols such as ethane-1,2-diol, diethylene glycol, propane-1,2-diol, dipropylene glycol, butane-1,4-diol, pentane-1,5-diol, hexane-1,6-diol, neopentyl glycol, glycerol, 1,1,1-trimethylolpropane or mixtures of the abovementioned alcohols with organic dicarboxylic acids or the anhydrides or esters thereof, for example succinic acid, glutaric acid, adipic acid, trimethyladipic acid, suberic acid, azelaic acid, sebacic acid, dodecanedicarboxylic acid, maleic acid, fumaric acid, dimer fatty acid, phthalic acid, phthalic anhydride, isophthalic acid, terephthalic acid, dimethyl terephthalate, hexahydrophthalic acid, trimellitic acid and trimellitic anhydride or mixtures of the abovementioned acids, as are polyester polyols formed from lactones such as ε-caprolactone.

Particularly suitable are polyester diols, in particular those produced from adipic acid, azelaic acid, sebacic acid, dodecanedicarboxylic acid, dimer fatty acid, phthalic acid, isophthalic acid and terephthalic acid as the dicarboxylic acid or from lactones such as ε-caprolactone and from ethylene glycol, diethylene glycol, neopentyl glycol, butane-1,4-diol, hexane-1,6-diol, dimer fatty acid diol, and cyclohexane-1,4-dimethanol as the dihydric alcohol.

Suitable polycarbonate polyols include in particular those obtainable by reaction for example of the abovementioned alcohols used to form the polyester polyols with dialkyl carbonates such as dimethyl carbonate, diaryl carbonates such as diphenyl carbonate, or phosgene. Likewise suitable are polycarbonates obtainable from the copolymerization of $CO_2$ with epoxides such as ethylene oxide and propylene oxide. Polycarbonate diols, in particular amorphous polycarbonate diols, are particularly suitable.

Further suitable polyols are poly(meth)acrylate polyols.

Also suitable are polyhydroxy-functional fats and oils, for example natural fats and oils, in particular castor oil, or so-called oleochemical polyols obtained by chemical modification of natural fats and oils, the epoxy polyesters or epoxy polyethers obtained for example by epoxidation of unsaturated oils and subsequent ring opening with carboxylic acids or alcohols respectively, or polyols obtained by hydroformylation and hydrogenation of unsaturated oils. Also suitable are polyols obtained from natural fats and oils by degradation processes such as alcoholysis or ozonolysis and subsequent chemical linking, for example by transesterification or dimerization, of the thus obtained degradation products or derivatives thereof. Suitable degradation products of natural fats and oils are in particular fatty acids and fatty alcohols and also fatty acid esters, in particular the methyl esters (FAME), which can be derivatized to hydroxy fatty acid esters, for example by hydroformylation and hydrogenation.

Likewise suitable are, in addition, polyhydrocarbon polyols, also referred to as oligohydrocarbonols, for example polyhydroxy-functional ethylene-propylene, ethylene-butylene or ethylene-propylene-diene copolymers, for example those produced by Kraton Polymers, USA, or polyhydroxy-functional copolymers of dienes, such as 1,3-butadiene or diene mixtures, and vinyl monomers such as styrene, acrylonitrile or isobutylene, or polyhydroxy-functional polybutadiene polyols, for example those which are produced by copolymerization of 1,3-butadiene and allyl alcohol and which may also be hydrogenated.

Also suitable are polyhydroxy-functional acrylonitrile/butadiene copolymers, such as those that can be produced from epoxides or amino alcohols and carboxyl-terminated acrylonitrile/butadiene copolymers, which are commercially available under the name Hypro® (formerly Hycar®) CTBN from Emerald Performance Materials, LLC, USA.

All the recited polyols have an average molecular weight from 250 to 15 000 g/mol, in particular from 400 to 10 000 g/mol, preferably from 1000 to 8000 g/mol, and an average OH functionality in the range from 1.5 to 4, preferably 1.7 to 3. However, it is entirely possible for the composition to also include proportions of monools (polymers having only one hydroxyl group).

Particularly suitable polyols are polyester polyols and polyether polyols, in particular polyoxyethylene polyol, polyoxypropylene polyol, and polyoxypropylene polyoxyethylene polyol, preferably polyoxyethylene diol, polyoxypropylene diol, polyoxyethylene triol, polyoxypropylene triol, polyoxypropylene polyoxyethylene diol, and polyoxypropylene polyoxyethylene triol.

The first component A preferably further comprises at least one diol A2 having two hydroxyl groups joined via a C2 to C9 carbon chain.

Suitable diols A2 are especially linear or branched alkylene diols having two primary or secondary hydroxyl groups, alkylene diols having one primary and one secondary hydroxyl group, and cycloaliphatic diols.

The diol A2 is preferably a linear aliphatic diol having two primary hydroxyl groups that are linked via a C4 to C9 carbon chain. Such a diol has the advantage of yielding polyurethanes having particularly high moduli of elasticity in the region of low elongation, for example between 0 and 5%, which is advantageous for tough, dimensionally stable molded articles in particular.

In particular, the diol A2 is selected from the group consisting of ethylene glycol, propane-1,3-diol, butane-1,4-diol, pentane-1,5-diol, hexane-1,6-diol, heptane-1,7-diol, octane-1,8-diol, nonane-1,9-diol, butane-1,3-diol, butane-2,3-diol, 2-methylpropane-1,3-diol, pentane-1,2-diol, pentane-2,4-diol, 2-methylbutane-1,4-diol, 2,2-dimethylpropane-1,3-diol (neopentyl glycol), hexane-1,2-diol, butane-1,4-diol, 3-methylpentane-1,5-diol, octane-1,2-diol, octane-3,6-diol, 2-ethylhexane-1,3-diol, 2,2,4-trimethylpentane-1,3-diol, 2-butyl-2-ethylpropane-1,3-diol, 2,7-dimethyloctane-3,6-diol, cyclohexane-1,4-diol, cyclohexane-1,3-dimethanol and cyclohexane-1,4-dimethanol.

The diol A2 is particularly preferably selected from the group consisting of butane-1,4-diol, pentane-1,5-diol, hexane-1,6-diol, heptane-1,7-diol, octane-1,8-diol and nonane-1,9-diol.

The diol A2 is most preferably selected from the group consisting of butane-1,4-diol, pentane-1,5-diol, hexane-1,6-diol and nonane-1,9-diol. These diols are commercially readily available and provide polyurethanes having particularly high moduli of elasticity at low elongation when cured.

The first component A preferably comprises between 1% and 25% by weight, in particular 5% to 20% by weight, particularly preferably 10% to 15% by weight, of diol A2.

In addition to these recited polyols A1 and A2, it is possible to include small amounts of further low-molecular-weight dihydric or polyhydric alcohols such as diethylene glycol, triethylene glycol, the isomeric dipropylene glycols and tripropylene glycols, the isomeric decanediols and undecanediols, hydrogenated bisphenol A, dimeric fatty alcohols, 1,1,1-trimethylolethane, 1,1,1-trimethylolpropane, glycerol, pentaerythritol, sugar alcohols such as xylitol, sorbitol or mannitol, sugars such as sucrose, other higher polyhydric alcohols, low-molecular-weight alkoxylation products of the abovementioned dihydric and polyhydric alcohols, and also mixtures of the abovementioned alcohols. In addition, polyols containing other heteroatoms, for example methyldiethanolamine or thiodiglycol, may also be included.

The first component A further comprises at least one compound T that has at least one thiol group. Suitable are all compounds that have at least one thiol or mercapto group and that can be formulated into the composition according to the invention. A thiol group is understood here as meaning an —SH group that is attached to an organic radical, for example an aliphatic, cycloaliphatic or aromatic carbon radical.

Preference is given to compounds having 1 to 6, in particular 1 to 4, most preferably 1 or 2 thiol groups. Compounds having a thiol group have the advantage that they do not form complexes with the metal catalyst K, which tend to be poorly soluble, and that the pot life can be adjusted particularly precisely. Compounds having two thiol groups have the advantage that the mechanical properties of the composition after curing are improved.

Examples of suitable compounds T having a thiol group are 3-mercaptopropyltrimethoxysilane, 3-mercaptopropyltriethoxysilane, 3-mercaptopropane-1,2-diol, 2-mercaptotoluimidazole or 2-mercaptobenzothiazole.

Examples of suitable compounds T having more than one thiol group are ethylene glycol di(3-mercaptopropionate), ethylene glycol dimercaptoacetate, dipentaerythritol hexa(3-mercaptopropionate), 2,3-dimercapto-1,3,4-thiadiazole or pentaerythritol tetrakis(3-mercaptopropionate).

The compound T is preferably selected from the group consisting of ethylene glycol di(3-mercaptopropionate), ethylene glycol dimercaptoacetate, dipentaerythritol hexa(3-mercaptopropionate), and 3-mercaptopropyl trimethoxysilane.

The molar ratio of all the thiol groups in the at least one compound T to all metal atoms in the at least one metal catalyst K must be between 1:1 and 250:1. It is preferably between 2:1 and 150:1, in particular between 5:1 and 100:1. This quantitative ratio allows the pot life to be adjusted, specifically within the intrinsic limits of the particular composition, through, for example, the content of catalyst, the reactivity of the isocyanates present, and the amount thereof. The lower limit of the pot life is the pot life that is obtained in a given composition when using a defined amount of catalyst without addition of compound T.

In many situations suitable for use in accordance with the invention in the 3D printing method, and as a consequence of the large number of isocyanate groups in the presence of a catalyst but without compound T, no effective pot life is achieved, and the composition starts to cure almost immediately on mixing the two components.

It is generally possible to set the pot life very accurately and hence to optimize it for a given 3D printing system. It is possible to set pot lives of less than one minute up to a few hours.

The upper limit of the adjustable pot life is accordingly the pot life that would be achieved through the uncatalyzed isocyanate-hydroxyl reaction if a catalyst is not used. Even without the use of a catalyst, this reaction will commence at some point after mixing the two components. However, the reaction without catalyst proceeds more slowly and with the development of poorer mechanical properties in the cured material.

The key advantage achieved by the two-component polyurethane composition of the invention in the 3D printing method of the invention is a system that cures and hardens with extraordinary rapidity, while at the same time having an adequately long pot life that allows it to be processed in a user-friendly manner and in accordance with the given 3D printing system. It is thus possible, for example, also to produce larger shaped articles having long layer cycles. On the other hand, in the case of smaller shaped articles and appropriate formulation of the polyurethane composition, it is possible to achieve a very short pot life and curing time, and hence a very high printing speed.

The second component B comprises firstly at least one polyisocyanate I.

The polyisocyanate I is present in relatively high amounts, which is very advantageous for the development of mechanical properties that are good enough for use as a structural adhesive or matrix for composite materials.

The second component contains sufficient polyisocyanate I for it to comprise at least 5% by weight, in particular at least 6% by weight, preferably at least 7.5% by weight of isocyanate groups based on the overall polyurethane composition.

All commercially available polyisocyanates suitable for polyurethane production, in particular diisocyanates, may be used as polyisocyanates I for the production of the polyurethane polymer in the composition according to the invention.

Suitable polyisocyanates are in particular monomeric di- or triisocyanates and also oligomers, polymers, and derivatives of monomeric di- or triisocyanates, and any mixtures thereof.

Suitable aromatic monomeric di- or triisocyanates are in particular tolylene 2,4- and 2,6-diisocyanate and any mixtures of these isomers (TDI), diphenylmethane 4,4'-, 2,4'-, and 2,2'-diisocyanate and any mixtures of these isomers (MDI), mixtures of MDI and MDI homologs (polymeric MDI or PMDI), 1,3- and 1,4-phenylene diisocyanate, 2,3,5,6-tetramethyl-1,4-diisocyanatobenzene, naphthalene 1,5-diisocyanate (NDI), 3,3'-dimethyl-4,4'-diisocyanatodiphenyl (TODI), dianisidine diisocyanate (DADI), 1,3,5-tris(isocyanatomethyl)benzene, tris(4-isocyanatophenyl)methane, and tris(4-isocyanatophenyl) thiophosphate.

Suitable aliphatic monomeric di- or triisocyanates are in particular tetramethylene 1,4-diisocyanate, 2-methylpentamethylene 1,5-diisocyanate, hexamethylene 1,6-diisocyanate (HDI), 2,2,4- and 2,4,4-trimethylhexamethylene 1,6-diisocyanate (TMDI), decamethylene 1,10-diisocyanate, dodecamethylene 1,12-diisocyanate, lysine diisocyanate and lysine ester diisocyanate, cyclohexane 1,3- and 1,4-diisocyanate, 1-methyl-2,4- and -2,6-diisocyanatocyclohexane and any mixtures of these isomers (HTDI or $H_6TDI$), 1-isocyanato-3,3,5-trimethyl-5-isocyanatomethylcyclohexane (=isophorone diisocyanate or IPDI), perhydrodiphenylmethane 2,4'- and 4,4'-diisocyanate (HMDI or $H_{12}MDI$), 1,4-diisocyanato-2,2,6-trimethylcyclohexane (TMCDI), 1,3- and 1,4-bis(isocyanatomethyl)cyclohexane, m- and p-xylylene diisocyanate (m- and p-XDI), m- and p-tetramethylxylylene 1,3- and 1,4-diisocyanate (m- and p-TMXDI) and bis(1-isocyanato-1-methylethyl)naphthalene, dimer and trimer fatty acid isocyanates such as 3,6-bis(9-isocyanatononyl)-4,5-di-(1-heptenyl)cyclohexene (dimeryl diisocyanate), and α,α,α',α',α'',α''-hexamethyl-1,3,5-mesitylene triisocyanate.

Preference among these is given to MDI, TDI, HDI, and IPDI.

Suitable oligomers, polymers, and derivatives of the monomeric di- and triisocyanates mentioned are especially those derived from MDI, TDI, HDI, and IPDI. Particularly suitable among these are commercially available types, in particular HDI biurets such as Desmodur® N 100 and N 3200 (from Covestro), Tolonate® HDB and HDB-LV (from Vencorex), and Duranate® 24A-100 (from Asahi Kasei); HDI isocyanurates such as Desmodur® N 3300, N 3600, and N 3790 BA (all from Covestro), Tolonate® HDT, HDT-LV, and HDT-LV2 (from Vencorex), Duranate® TPA-100 and THA-100 (from Asahi Kasei), and Coronate® HX (from Nippon Polyurethane); HDI uretdiones such as Desmodur® N 3400 (from Covestro); HDI iminooxadiazinediones such as Desmodur® XP 2410 (from Covestro); HDI allophanates such as Desmodur® VP LS 2102 (from Covestro); IPDI isocyanurates, for example in solution as Desmodur® Z 4470 (from Covestro) or in solid form as Vestanat® T1890/

100 (from Evonik); TDI oligomers such as Desmodur® IL (from Covestro); and also mixed isocyanurates based on TDI/HDI, for example as Desmodur® HL (from Covestro). Also particularly suitable are MDI forms that are liquid at room temperature (so-called "modified MDI"), which are mixtures of MDI with MDI derivatives such as, in particular, MDI carbodiimides or MDI uretonimines or MDI urethanes, known by trade names such as Desmodur® CD, Desmodur® PF, Desmodur® PC (all from Covestro) or Isonate® M 143 (from Dow), and mixtures of MDI and MDI homologs (polymeric MDI or PMDI), available under trade names such as Desmodur® VL, Desmodur® VL50, Desmodur® VL R10, Desmodur® VL R20, Desmodur® VH 20 N, and Desmodur® VKS 20F (all from Covestro), Isonate® M 309, Voranate® M 229 and Voranate® M 580 (all from Dow) or Lupranat® M 10 R (from BASF). The abovementioned oligomeric polyisocyanates are in practice typically mixtures of substances having different degrees of oligomerization and/or chemical structures. They preferably have an average NCO functionality of 2.1 to 4.0.

The polyisocyanate is preferably selected from the group consisting of MDI, TDI, HDI, and IPDI, and oligomers, polymers, and derivatives of the recited isocyanates, and mixtures thereof.

The polyisocyanate preferably contains isocyanurate, iminooxadiazinedione, uretdione, biuret, allophanate, carbodiimide, uretonimine or oxadiazinetrione groups.

Particularly preferred polyisocyanates are MDI forms that are liquid at room temperature. These are especially what are called polymeric MDI, and MDI having fractions of oligomers or derivatives thereof. The content of MDI (=diphenylmethane 4,4'-, 2,4'- or 2,2'-diisocyanate and any mixtures of these isomers) in such liquid MDI forms is in particular 50 to 95% by weight, in particular 60 to 90% by weight.

Particularly preferred as the polyisocyanate is polymeric MDI and MDI types that are liquid at room temperature and contain proportions of MDI carbodiimides or their adducts.

With these polyisocyanates, particularly good processing properties and particularly high strengths are obtained.

The polyisocyanate of the second component may contain proportions of polyurethane polymers having isocyanate groups. Either the second component may comprise a polyurethane polymer having isocyanate groups that was produced separately, or the polyisocyanate has been mixed with at least one polyol, in particular a polyether polyol, with the isocyanate groups being present in a stoichiometric excess over the OH groups.

In the composition according to the invention, polyisocyanate I is preferably present in an amount from 10% by weight to 35% by weight, in particular from 15% by weight to 30% by weight, particularly preferably from 20% by weight to 25% by weight, based on the overall composition.

The first component A and/or the second component B further comprises at least one metal catalyst K for the reaction of hydroxyl groups and isocyanate groups that is able to form thio complexes. Suitable metal catalysts K are thus all metal catalysts that may be used as a crosslinking catalyst in polyurethane chemistry and that can at the same time form thio complexes with thiols in the presence thereof.

The metal catalyst K is preferably present only in the first component A. This has the advantage of achieving better storage stability.

Examples of suitable metal catalysts are bismuth, zinc, tin or zirconium compounds, including complexes and salts of these metals.

The metal catalyst K preferably comprises a bismuth compound, in particular a bismuth(III) compound. In addition to the desired properties as a catalyst able to form thio complexes, a bismuth compound has the advantage of low acute toxicity.

A multiplicity of conventional bismuth catalysts may be used as the bismuth compound. Examples are bismuth carboxylates, for example bismuth acetate, oleate, octoate or neodecanoate, bismuth nitrate, bismuth halides such as the bromide, chloride, or iodide, bismuth sulfide, basic bismuth carboxylates such as bismuthyl neodecanoate, bismuth subgallate or bismuth subsalicylate, and mixtures thereof.

In a preferred embodiment, the metal catalyst K is a bismuth(III) complex containing at least one ligand based on 8-hydroxyquinoline. Such complexes are described in EP 1551895. This is preferably a bismuth(III) carboxylate containing one molar equivalent of an 8-hydroxyquinoline ligand.

In a further preferred embodiment, the metal catalyst K is a bismuth(III) complex containing at least one ligand based on a 1,3-ketoamide. Such complexes are described in EP 2791153. This is preferably a bismuth(III) carboxylate containing 1 to 3 molar equivalents of a 1,3-ketoamide ligand.

The polyurethane composition may contain, in addition to the constituents already mentioned, further constituents as known to the person skilled in the art from two-component polyurethane chemistry. These may be present in just one component or in both.

Preferred further constituents are inorganic or organic fillers, such as, in particular, natural, ground or precipitated calcium carbonates, optionally coated with fatty acids, in particular stearic acid, baryte (heavy spar), talcs, quartz powders, quartz sand, dolomites, wollastonites, kaolins, calcined kaolins, mica (potassium aluminum silicate), molecular sieves, aluminum oxides, aluminum hydroxides, magnesium hydroxide, silicas including finely divided silicas from pyrolysis processes, industrially produced carbon blacks, graphite, metal powders such as aluminum, copper, iron, silver or steel, PVC powder or hollow spheres, and also flame-retardant fillers such as hydroxides or hydrates, in particular hydroxides or hydrates of aluminum, preferably aluminum hydroxide.

The addition of fillers is advantageous in that it increases the strength of the cured polyurethane composition.

The polyurethane composition preferably comprises at least one filler selected from the group consisting of calcium carbonate, carbon black, kaolin, baryte, talc, quartz powder, dolomite, wollastonite, kaolin, calcined kaolin, and mica.

Particularly preferred as fillers are ground calcium carbonates, calcined kaolins or carbon black.

It may be advantageous to use a mixture of different fillers. Most preferred are combinations of ground calcium carbonates or calcined kaolins and carbon black.

The content of filler F in the composition is preferably in the range from 5% by weight to 50% by weight, in particular 10% by weight to 40% by weight, particularly preferably 15% by weight to 30% by weight, based on the overall composition.

It is possible for further constituents to be additionally present, in particular solvents, plasticizers and/or extenders, pigments, rheology modifiers such as, in particular, amorphous silicas, desiccants such as, in particular, zeolites, adhesion promoters such as, in particular, organofunctional trialkoxysilanes, stabilizers against oxidation, heat, light, and UV radiation, flame-retardant substances, and also surface-active substances, in particular wetting agents and defoamers.

The polyurethane composition comprises preferably less than 0.5% by weight, in particular less than 0.1% by weight of carboxylic acids, based on the overall composition. Any carboxylate ligands introduced through the metal catalyst are not included here among the stated carboxylic acids.

A preferred polyurethane composition comprises a first component A comprising
- 30% to 90% by weight, preferably 40% to 80% by weight, in particular 50% to 70% by weight, of polyol A1,
- 1% to 25% by weight, preferably 5% to 20% by weight, in particular 10% to 15% by weight, of diol A2,
- 1% to 5% by weight, preferably 1.25% to 3% by weight, in particular 1.5% to 2% by weight, of a compound T having at least one thiol group,
- 0.05% to 0.5% by weight, preferably 0.1% to 0.3% by weight, in particular 0.15% to 0.2% by weight, of a metal catalyst K, and
- 10% to 50% by weight, preferably 15% to 40% by weight, in particular 20% to 30% by weight, of fillers, and optionally further constituents.

A preferred polyurethane composition comprises a second component B comprising 40% to 100% by weight, in particular 45% to 80% by weight, of polyisocyanate I.

It is advantageous if the first and second components are formulated so that their mixing ratio in parts by weight and parts by volume is in the range from 10:1 to 1:10. Particular preference is given to a volume mixing ratio of 5:1 to 1:5, especially 2:1 to 1:2, most preferably 1:1. Such a mixing ratio enables a particularly homogeneous mixture and particularly exact conveying of the components.

In the mixed polyurethane composition, the ratio before curing between the number of isocyanate groups and the number of groups reactive toward isocyanates is preferably approximately in the range of 1.2 to 1, preferably 1.15 to 1.05. However, it is also possible, although not usually preferred, for the proportion of isocyanate groups to be substoichiometric with respect to groups reactive toward isocyanates.

The polyurethane composition, directly after mixing of components A and B, is pumpable, especially free-flowing, at 23° C. It is preferable that components A and B and the mixture of the two components of the composition are thixotropic, i.e. have a lower viscosity under higher shear forces. Thixotropy can be achieved, for example, by means of the thixotropic additives that are well known to the person skilled in the art. Such thixotropic additives are, for example, urea compounds of the kind as described as "thixotropy endowing agents" in WO 02/48228 on pages 9 to 11, polyamide waxes, bentonites or fumed silicas.

Components A and B and the polyurethane composition, directly after mixing of components A and B, preferably have a viscosity, measured at 20° C. on a plate-plate viscometer with plate separation 1 mm and plate diameter 25 mm, of <10 000 Pas, preferably <5000 Pas, at a shear rate of 0.01 $s^{-1}$ and <1000 Pas, preferably <500 Pas, at a shear rate of 1 $s^{-1}$, and <100 Pas, preferably <75 Pas, at a shear rate of 10 $s^{-1}$. The two components A and B preferably each have a viscosity, measured at 20° C. on a plate-plate viscometer with plate separation 1 mm and plate diameter 25 mm, of less than 75 Pas at a shear rate of 10 $s^{-1}$.

The viscosity can be adjusted by routine tests via formulation measures, for example the selection of the polyols and/or fillers and the use of low-viscosity additions such as plasticizers. It is likewise possible to achieve shear-thinning behavior, i.e. thixotropy, as described above, optionally through use of thixotropic additives.

The two components are produced separately and preferably with the exclusion of moisture. The two components are typically each stored in a separate container. The further constituents of the polyurethane composition may be present as a constituent of the first or second component, with further constituents that are reactive toward isocyanate groups preferably being a constituent of the first component. A suitable container for storage of the respective component is especially a vat, a hobbock, a bag, a bucket, a can, a cartridge or a tube. The components are both storage-stable, meaning that they can be stored prior to use for several months up to one year or longer, without any change in their respective properties to a degree of relevance to their use.

The two components are stored separately from one another prior to the mixing of the composition and are only mixed with one another on or immediately prior to use. They are advantageously present in a package consisting of two separate chambers.

The mixing upstream of or within the 3D printer in the method of the invention is typically effected by means of static mixers or with the aid of dynamic mixers. In the mixing, it should be ensured that the two components are mixed with maximum homogeneity. If the two components are mixed incompletely, local deviations from the advantageous mixing ratio will occur, which can result in a deterioration in the mechanical properties.

On contact of the first component with the second component, after the latency period triggered by the catalyst K temporarily blocked by the compound T, the curing commences through chemical reaction. This involves reaction of the hydroxyl groups and any other substances present that are reactive toward isocyanate groups with the isocyanate groups. Excess isocyanate groups react predominantly with moisture. As a result of these reactions, the polyurethane composition cures to give a solid material. This process is also referred to as crosslinking.

The two components A and B are supplied from the site of provision to the continuous mixer, preferably by means of a pump and a conveying conduit, especially a hose. It is also possible that the mixer is mounted directly on the vessels for the two components A and B, and the mixed composition of the two components A and B is conveyed via a conveying conduit, especially a hose, to the printhead. The two components A and B and the mixture thereof preferably have good conveyability. Good conveyability is important for 3D printing because it is normally a prerequisite or at least advantageous for homogeneous application. Specifically for the printing of large shaped articles, the length of a conveying conduit between pump and mixer may reach up to a few meters or more, which can lead to high pressure in the conveying conduit. A high pressure, especially in a hose, is disadvantageous because the material is significantly stressed and can burst in the event of overload. Compositions of good conveyability can prevent excessive buildup of pressure.

The pressure in the conveying conduit between pump and continuous mixer is preferably below 40 bar, more preferably below 25 bar.

Components A and B are preferably formulated in terms of amounts of polyisocyanates I, catalyst K and compound T in such a way that the mixed composition retains good shapability for a few seconds to a few minutes. As a result, the layers can be applied homogeneously and form good coherence, and the surface of the shaped body produced can still be aftertreated if desired, for example smoothed.

If the compound T is dosed excessively, the mixed polyurethane composition applied in layers only attains the necessary strength at a late stage, so that a further layer can be applied thereto. As a result, the printing speed has to be significantly reduced, or it is necessary to include wait times, which delays the completion of the shaped part.

Component A and component B and optionally further additives can be conveyed to the mixer, for example, via one or more conveying devices, especially pumps and conveying conduits. The conveying devices are especially controllable by means of a control unit, in particular independently of one another.

The static or continuous mixer is preferably mounted on a moving printhead. The printhead preferably has a discharge nozzle for the layer-by-layer application of the mixed polyurethane composition.

In one embodiment, the static or dynamic continuous mixer is mounted on the moving printhead directly on this discharge nozzle. This allows additional control of the evolution of strength of the mixed polyurethane composition over time.

The dwell time of the polyurethane composition that is to be mixed or has been mixed in the mixer is preferably less than 30 s, more preferably less than 20 s, especially preferably less than 15 s.

The average dwell time of the binder composition in the mixing device is the average period for which a particle dwells in the mixing device, from inlet to outlet.

The mixed polyurethane composition, immediately after component B has been mixed into component A, has good deformability and can be applied in homogeneous layers with the printhead. The mixed composition may be applied here in one or more layers. These layers are self-supporting immediately or after no later than a short time, and show a rapid evolution of strength. Subsequent layers can therefore be applied without difficulty to the layers beneath at short intervals and in a height of less than one millimeter up to several centimeters.

The mixed polyurethane composition is preferably applied by means of a moving printhead.

The printhead especially has at least one discharge opening which may be identical to the outlet of the continuous mixer through which the curable mixture can be discharged.

The good sag resistance of the layers applied means that there is no need to use support elements or reinforcing elements.

There is preferably a discharge nozzle that shapes the material discharged at the discharge opening. The shape is not restricted. The discharge nozzle preferably has a rectangular, square or round shape. The diameter of the discharge nozzle is likewise not particularly restricted. In the case of very small diameters and simultaneously high viscosity of the composition, higher pressures are needed for expression. It has been found to be advantageous to use nozzles having exit openings having diameters of 0.5 mm to 1 cm, preferably 1 mm to 5 mm, especially 2 mm to 4 mm. There may also be further shaping elements mounted in the discharge nozzle.

In other embodiments, the exit opening may also be larger, up to a several centimeters. This allows the application of large beads or layers of mixed polyurethane composition, where these beads or layers may have thicknesses or diameters of several centimeters or more. The polyurethane composition of the invention, even in large layers or volumes, cures homogeneously and rapidly.

In a preferred variant, the printhead is movable in one, two or three spatial directions. Particular preference is given to a printhead movable in three spatial directions. This makes it possible to produce shaped bodies of virtually any shape in a particularly simple manner.

The movement of the printhead can especially be achieved by mounting the printhead on a conventional robot arm movable in one, two or three spatial directions.

The printhead is preferably on a 3-axis gantry robot system. This enables the rapid printing even of large shaped bodies with flexible shaping.

It is also possible to perform movements in one, two or three spatial directions through corresponding movements of the build chamber region. The build chamber region is that region, for example a surface, on which the shaped body is being constructed.

The method of the invention can surprisingly rapidly create shaped bodies through layer-by-layer application or as a single layer or bead.

The height of a single layer, typically measured in a direction essentially perpendicular to the planes formed by single layers, especially in vertical direction, is preferably 0.5 mm to 10 mm, more preferably 1 mm to 5 mm, especially 2 mm to 4 mm. In some embodiments, these layers or beads may also have a thickness or diameter of several centimeters.

The total height of the shaped body or the thickness of all individual layers of the shaped body together is preferably 1 cm to 50 cm or more, more preferably 5 cm to 40 cm, even more preferably 10 cm to 30 cm.

The surface of the shaped body may firstly be smoothed, made good or specifically deformed with suitable tools or materials prior to formation of a completely dry skin. This can be effected as part of the manufacture by machine, or manually as a separate step. The surface may also be provided with a functional or decorative coating, or parts may be embedded therein.

After completion of curing, the shaped article may likewise be processed further, for example by grinding, cutting, machining, water jet or laser treatment, or other abrasive, cutting or smoothing techniques. This allows the shape of the shaped article to be adjusted further, for example if the surface structure or shaped article dimensions still does not meet the requirements.

The shaped body may also be cut with suitable tools either before or after completion of curing. It is thus possible to introduce holes, openings, recesses or else cuts, especially for later processing steps, into the shaped body.

The shaped body produced by the method of the invention may have virtually any desired shape. The shaped body is, for example, part of an article of manufacture, such as a footwear sole, a finished part for an industrial structure, a prototype, a design study, a replacement part or an artistic object. The shaped body here may have a solid form or a hollow form, with or without a base.

The present invention further provides a shaped body produced by the method of the invention.

In a preferred embodiment of the method of the invention, the composition is applied to a further article or body. In this case, the composition applied in one or more layers cures on said article to form a shaped body. During the curing, the composition builds up adhesion to the article, and the cured shaped body is consequently firmly adhesively secured to the article.

Such further articles may be made of any material, preferably of metal, plastic or wood, or of surface-coated materials of this kind, for example powder-coated metal.

Such further articles may have any shape and geometry. However, their geometric characteristics must be such that the composition can be applied thereto via the method of the invention.

This embodiment of the method of the invention produces a shaped body from cured polyurethane composition of the invention that has been adhesively secured to the article. In this way, it is possible, for example, to provide powder-coated metal articles with rubberlike shaped bodies that were obtainable to date only via the complex sticking of rubber elements onto powder-coated metal articles. This permits a distinct increase in efficiency in industrial manufacture since it is possible according to the present invention to replace an existing multistep method of bonding with an automated incision method.

A specific example of such manufacture is the securing of rubber bodies to shock absorbers of automobiles. The prior art process envisages first pretreating these shock absorbers with a primer and then securing a previously produced rubber body thereto.

The method according to the present invention can be used to apply a polyurethane composition directly to the shock absorber, in which case the composition in the desired shape directly builds up adhesion to the shock absorber. The polyurethane composition according to the present invention, in preferred embodiments, has very good adhesion properties to powder-coated metals and does not require any pretreatment by means of primer. Moreover, in the cured state, in preferred embodiments, it has rubberlike properties such as elasticity and toughness that are virtually identical to those of a conventional rubber body.

The present invention further provides a shaped body produced by the method of the invention and applied to an article or body, wherein the shaped body composed of cured polyurethane composition has been adhesively secured to this article or body.

The invention is further elucidated hereinafter by examples, but these are not intended to restrict the invention in any way.

EXAMPLES

Substances Used:

TABLE 1

Substances used

| | |
|---|---|
| Voranol CP 4755 | Voranol ® CP 4755 (Dow Chemical); polyether triol, CAS No. 9082-00-2; MW: 5000 g/mol; OH value: 35 mg KOH/g |
| Pentane-1,5-diol | (Sigma Aldrich) |
| Thiocure GDMP | Thiocure ® GDMP (Bruno Bock Thiochemicals); glycol di(3-mercaptopropionate) |
| Desmodur CD-L | Desmodur ® CD-L (Covestro); modified diphenylmethane 4,4'-diisocyanate (MDI); NCO content: 29.5% by weight |
| Monarch 570 | Monarch ® 570 (Cabot Corp.); carbon black (filler) |
| Whitetex | White Tex ® (BASF); calcined aluminum silicate (filler) |
| Bi cat. (2.68 mmol Bi/g) | 35% by weight of Coscat 83 (organobismuth catalyst; Coscat ® 83 (Vertellus Specialties Inc.)) in plasticizer containing 1 molar equivalent of 8-hydroxyquinoline (based on Bi) |

Production of Components A and B

For each composition, the ingredients of the first component A specified in table 2 below were processed in the amounts specified (in parts by weight or wt %), by means of a vacuum dissolver with the exclusion of moisture, to give a homogeneous paste and stored airtight. The ingredients of the second component B specified in the tables were likewise processed and stored. The two components were each introduced into one compartment of an airtight twin cartridge.

TABLE 2

Two-component polyurethane composition for 3D printing

| Ingredient | Parts by weight |
|---|---|
| Component A | |
| Voranol CP 4755 | 60 |
| Pentane-1,5-diol | 12 |
| Monarch 570 | 10 |
| Whitex | 15.7 |
| Thiocure GDMP | 1.5 |
| Bi cat. | 0.8 |
| TOTAL | 100 |
| Component B | |
| Desmodur CD-L | 44 |
| Voranol CP-4755 | 32 |
| Whitex | 15 |
| Monarch 570 | 10 |
| TOTAL | 100 |

Printing Test

The abovementioned twin cartridge (with one cartridge of the twin cartridge containing component A and the other component B, both components according to the ingredient data in table 2) was connected to a 3D printer such that the cartridge outlet opened into a static mixer of length 10 cm.

The outlet of the static mixer opened into a hose connected to the printhead of the 3D printer. The printhead had a round exit opening having a diameter of 2 mm. The 3D printer used was a commercial Delta WASP 2040 3D printer (from WASP CSP S.r.l., Italy). The twin cartridge was expressed at a flow rate of 100 ml/minute by means of a pneumatic piston. The two components A and B were mixed in a volume ratio A:B (v/v) of 1:1. The dwell time in the mixer was about 10-20 s.

It was thus possible, in a continuous process, to print a cylindrical hollow figure layer by layer with a height of 10 cm, a wall thickness of 2 mm and a diameter of 5 cm within 2-3 min. The composition was sag-resistant and dimensionally stable directly after application and subsequently cured continuously, although the curing of one layer was still incomplete when a second layer was applied thereto. This permitted good cohesion between the layers. After about 15 min, the shaped body was firm and had formed a dry skin.

The shaped body had a nice smooth surface and was of solid, elastic consistency.

The invention claimed is:

1. A method of applying a two-component polyurethane composition by means of 3D printing, comprising the steps of
   providing a pumpable first component A comprising
   at least one polyol A1 having an OH functionality in a range from 1.5 to 4 and an average molecular weight (number average) Mn in a range from 250 to 15 000 g/mol, and
   at least one diol A2 having two hydroxyl groups joined via a C2 to C9 carbon chain, and
   at least one compound T having at least one thiol group;
   feeding the first component A to a continuous mixer comprising
   an inlet,
   a mixing region having at least one static or dynamic mixing element connected to the inlet,
   an outlet into which the mixing region opens,
   wherein the first component A is conveyed through the at least one inlet into the mixing region;

feeding a pumpable second component B into the mixing region of the continuous mixer, where the second component B comprises at least one polyisocyanate I;

mixing the first component A with the second component B in the mixing region of the continuous mixer to give a mixed curable polyurethane composition;

conveying the mixed curable polyurethane composition to the outlet; and applying the mixed curable polyurethane composition in a 3D printing layer-by-layer manner under computer control according to a defined mass or shape;

wherein one of the two components A and B additionally includes at least one metal catalyst K for reaction of hydroxyl groups and isocyanate groups that is able to form thio complexes, and a molar ratio of all the thiol groups in the at least one compound T to all metal atoms in the at least one metal catalyst K is between 1:1 and 250:1.

2. The method as claimed in claim 1, wherein the metal catalyst K comprises a bismuth (III) compound.

3. The method as claimed in claim 2, wherein the bismuth (III) compound additionally contains an 8-hydroxyquinoline ligand or a 1,3-ketoamide ligand.

4. The method as claimed in claim 1, wherein the diol A2 is selected from the group consisting of butane-1,3-diol, butane-2,3-diol, butane-1,4-diol, 2-methylpropane-1,3-diol, pentane-1,2-diol, pentane-1,5-diol, pentane-2,4-diol, 2-methylbutane-1,4-diol, 2,2-dimethylpropane-1,3-diol, hexane-1,2-diol, hexane-1,6-diol, 3-methylpentane-1,5-diol, octane-1,2-diol, octane-3,6-diol, nonane-1,9-diol, 2-ethylhexane-1,3-diol, 2,2,4-trimethylpentane-1,3-diol, 2-butyl-2-ethylpropane-1,3-diol, 2,7-dimethyloctane-3,6-diol, cyclohexane-1,4-diol, cyclohexane-1,3-dimethanol and cyclohexane-1,4-dimethanol.

5. The method as claimed in claim 1, wherein the at least one compound T comprises a polythiol compound having 2 to 6 thiol groups, or a mercaptosilane.

6. The method as claimed in claim 5, wherein the at least one compound T is selected from the group consisting of ethylene glycol di (3-mercaptopropionate), ethylene glycol dimercaptoacetate, dipentaerythritol hexa (3-mercaptopropionate), and 3-mercaptopropyltrimethoxysilane.

7. The method as claimed in claim 1, wherein the molar ratio of all the thiol groups in the at least one compound T to all metal atoms in the at least one metal catalyst K is between 5:1 and 100:1.

8. The method as claimed in claim 1, wherein the metal catalyst K is present in the first component A.

9. The method as claimed in claim 1, wherein the polyol A1 comprises a polyether polyol.

10. The method as claimed in claim 1, wherein the polyisocyanate I is a form of diphenylmethane 4,4'-, 2,4'- or 2,2'-diisocyanate that is liquid at room temperature and any mixtures of these isomers (MDI) in the form of polymeric MDI or MDI containing proportions of oligomers or derivatives.

11. The method as claimed in claim 1, wherein the second component B comprises a polyurethane polymer containing isocyanate groups.

12. The method as claimed in claim 1, wherein the composition comprises less than 0.5% by weight of carboxylic acids, based on a total weight of the composition.

13. The method as claimed in claim 1, wherein the two components A and B each have a viscosity, measured at 20° C. on a plate-plate viscometer with plate separation 1 mm and plate diameter 25 mm, of less than 75 Pas at a shear rate of $10\ s^{-1}$.

14. The method as claimed in claim 1, wherein the static or dynamic mixer is mounted on a moving printhead.

15. The method as claimed in claim 1, wherein an individual layer formed in the applying step has a height of 0.5 mm to 1 cm.

16. The method as claimed in claim 1, wherein the step of applying the mixed curable polyurethane composition in a 3D printing layer-by-layer manner forms a shaped body having a total height of 1 cm to 50 cm.

* * * * *